(12) United States Patent
Blickle

(10) Patent No.: US 7,436,367 B2
(45) Date of Patent: Oct. 14, 2008

(54) BAYONET-MOUNT MOTOR-VEHICLE ANTENNA

(75) Inventor: Günther Blickle, Neustetten (DE)

(73) Assignee: Hirschmann Car Communication GmbH, Neckartenzlingen (DE)

( * ) Notice: Subject to any disclaimer, the term of this patent is extended or adjusted under 35 U.S.C. 154(b) by 128 days.

(21) Appl. No.: 11/236,872

(22) Filed: Sep. 27, 2005

(65) Prior Publication Data

US 2006/0103579 A1 May 18, 2006

(30) Foreign Application Priority Data

Sep. 28, 2004 (DE) .................. 10 2004 046 979
Sep. 19, 2005 (DE) .................. 10 2005 044 610

(51) Int. Cl.
*H01Q 1/32* (2006.01)

(52) U.S. Cl. ...................................... 343/713; 343/711
(58) Field of Classification Search ................. 343/711, 343/712, 713, 906

See application file for complete search history.

(56) References Cited

U.S. PATENT DOCUMENTS

| 1,946,063 | A |   | 2/1934  | Dodge    |         |
|-----------|---|---|---------|----------|---------|
| 3,555,551 | A | * | 1/1971  | Gronlund | 343/715 |
| 3,842,790 | A |   | 10/1974 | Clark    |         |
| 4,649,613 | A |   | 3/1987  | Bednarik | 29/253  |
| 6,469,678 | B1 |   | 10/2002 | Pullen | 343/888 |
| 7,002,523 | B2 | * | 2/2006 | Noro | 343/713 |
| 7,004,666 | B2 | * | 2/2006 | Kozlovski | 403/252 |
| 7,046,207 | B2 | * | 5/2006 | Takahashi | 343/711 |
| 7,088,297 | B2 | * | 8/2006 | Nakano et al. | 343/713 |
| 7,212,168 | B2 | * | 5/2007 | Kozlovski | 343/713 |
| 7,236,136 | B2 | * | 6/2007 | Noro | 343/713 |
| 7,338,316 | B2 | * | 3/2008 | Blickle | 439/546 |
| 2003/0068198 | A1 |   | 4/2003 | Kozlovski | 403/372 |
| 2004/0183734 | A1 |   | 9/2004 | Noro | 343/713 |

FOREIGN PATENT DOCUMENTS

DE        9102092      5/1991

\* cited by examiner

*Primary Examiner*—HoangAnh T Le
(74) *Attorney, Agent, or Firm*—Andrew Wilford

(57) ABSTRACT

An antenna for mounting on a motor-vehicle part formed with a throughgoing hole of nonround shape has a base plate engageable with the part over the hole and carrying antenna components and a stem projecting through the hole. A bayonet plate has an outer edge of nonround shape capable of passing axially through the hole of the part and not able to pass through the hole of the part in another angularly offset position. This bayonet plate can move angularly on the base plate between an install position and a holding position and is urged by a spring toward the base plate and against the part. Spacers engageable in the install position hold the bayonet plate at a predetermined large axial spacing from the base plate and disengage from each other in the holding position to allow the bayonet plate to be pressed by the spring against the motor-vehicle part.

10 Claims, 3 Drawing Sheets

BAYONET-MOUNT MOTOR-VEHICLE ANTENNA

FIELD OF THE INVENTION

The invention relates to a vehicle antenna and a method of mounting the antenna on part of the vehicle.

BACKGROUND OF THE INVENTION

Such an antenna used for example as a roof antenna is normally mounted on the vehicle body by providing its base plate with a threaded stud that is fitted through a hole in the vehicle body, then from inside screwing a nut on the screwthreads of the stud to fix the base plate on the vehicle body. Such a mounting system requires two people to carry out, since one person must hold the roof antenna in position on the outside and another must use tools inside the vehicle to screw it tight.

The known roof antennas and their mounting are for today's assembly requirements too expensive and time consuming.

OBJECT OF THE INVENTION

It is therefore an object of the invention to simplify the mounting of the antenna so that the mounting can be done without tools, without a second person, and without other aids. Instead the antenna should be simply mounted and fixed in the desired end position on the vehicle manner that is permanent, secure, and water-tight. It should further be possible to mount the antenna at any time from outside during assembly of the vehicle, even when the roof liner has already been installed.

SUMMARY OF THE INVENTION

This object is attained in that the support element is mounted on the base plate of the antenna such that during mounting or after mounting a pivoting movement effects a gripping of the vehicle part without the use of a tool and furthermore that it is so constructed that the antenna after mounting is in the desired end position, cannot move, and is sealed to the vehicle part.

The invention is based on the idea of replacing the known connections, as for example screw connections, snap connections, and the like, with a gripping system that is effected during and/or after fitting of the antenna to the vehicle part. In this manner it is possible for one person to mount the antenna in a simple manner, without for example having to have a second person fit a nut on a threaded stud while the first person holds the antenna in position on the vehicle part. This reduces the number of parts and even eliminates use of an installation tool in a very advantageous manner. The substantial advantage is that not only can a single person install the antenna, in fact in a single step by passing the support element carried on the base plate through an opening in the vehicle part and then pivoting the antenna so that this pivoting movement or its completion creates the gripping action, and the support element is furthermore so constructed that no further action is necessary and the antenna is left in the desired end position, fixedly mounted, and sealed. Preferably in this position the gripping force is maximized.

The gripping force is effected by a pivoting action, with a pivoting of the antenna, in particular its base plate, relative to the vehicle body. This is distinguished from the threading of a nut on the known threaded stud which is not considered to be a pivoting movement. Similarly the gripping action is not the same as an adhesive mounting.

Furthermore according to the invention a lower face of the base plate carries a bayonet plate that can be passed in a predetermined direction through a complementary hole in the vehicle part on mounting of the antenna and that moves underneath the vehicle part to spatially overlap it such that movement of the bayonet plate out of the hole of the vehicle part in a direction perpendicular to the upper face of the vehicle part is no longer possible. Making the support element a bayonet plate has the advantage that the antenna can be mounted on the vehicle part by a simple series of steps. To this end the vehicle part has a hole that fits with the outer shape of the support element so that fitting the support element through the hole of the vehicle part in the wrong position of the antenna is not possible but, once the desired end position of the antenna on the vehicle is reached, withdrawal is impossible. To this end according to a further embodiment of the invention the bayonet plate has a splined, triangular, quadrilateral, generally polygonal or other nonround outer shape by means of which it is possible after fitting the bayonet plate through the complementary hole in the vehicle body to produce overlapping or engagement under the vehicle part. The interaction of the shapes of the desired end position in the vehicle part and the outer shape of the support element or its bayonet plate make it possible to fit the antenna in an offset aligned position through the hole in the vehicle part and pivot it such that the pivoting releases the gripping force that secures the antenna in place on the vehicle part during and/or after completion of the pivoting action. This sequence of steps (for example fitting the antenna from above through the hole and then pivoting it) makes it possible for a single person to install the antenna in the vehicle part in the desired manner.

According to a further embodiment of the invention on continuing to move in the predetermined mounting direction on the antenna reaching the desired end nonaligned position on the vehicle body there is an automatic gripping of the vehicle part and a compression of a seal between the antenna and the vehicle part. Such an embodiment has the advantage that the antenna is fitted through the hole in the vehicle part and pivoted until the desired end position of the antenna on the vehicle part is attained. Only when this desired end position is obtained is the gripping force (prestressing) automatically established to draw the base plate and the seal tightly against the vehicle part. This has the advantage that the seal is not in action until the antenna is in the desired end position on the vehicle part in order to ensure that it is easy to rotate the antenna on the vehicle part. Only when the desired nonaligned end position is attained is the gripping force released so that the seal is also effective and the antenna is not only sealed tight, but also stable, with some compensation for an imperfect fit, on the vehicle part.

Furthermore according to the invention a spring element is provided that produces the necessary gripping force by means of a prestressed spring element. This spring element can be a spiral spring, a spring washer, or a stack of spring washers.

As already stated, according to the invention there is the following sequence of steps for mounting: perpendicular fitting of the support element through the hole in the vehicle part and then pivoting so that the support element triggers the gripping action with the vehicle part.

In a further embodiment of the invention to mount the antenna the support element is formed as a bayonet plate having a spring that creates a spring force between the base plate and the bayonet plate, that between the base plate and bayonet plate there are guide elements that permit limited pivoting of the base plate and bayonet plate relative to each other, that the bayonet plate has limiting elements that fit with abutments in the hole in the vehicle body and that there are between the base plate and the bayonet plate spacer elements with complementary seats in the second part that in an install position of the base plate relative to the bayonet plate space the base plate from the bayonet plate and in an angularly offset holding position engage in the cutouts so that the bayonet plate is biased by the spring force toward the base plate.

This is therefore an antenna that can be supplied as a complete unit to the vehicle-assembly plant. The antenna is one piece so that there is no separate mounting nut or support element. All the necessary parts are on the antenna and cannot be lost.

In a further embodiment of the invention the guide is slots in the base plate or preferably in the bayonet plate that interfit with bolts that are fixed on the bayonet plate or preferably on the base plate. In this manner the base plate and the bayonet plate pivot limitedly relative to each other in the slots, in a manner whose significance is detailed below.

The limiting elements are bumps on the bayonet plate that project toward the base plate. The bayonet plate is generally circular and has outwardly projecting teeth. The bumps are on the edges of the teeth and project toward the base plate. Each tooth is formed next to the respective bump with a recess that extends to a center ring of the bayonet plate. The opening in the vehicle part has a central generally circular hole in which notches complementary to the bayonet teeth open so that the bayonet plate can be fitted through the opening in the vehicle body.

The above-given features produce an antenna where the vehicle-body teeth fit between the bayonet-plate notches with the recesses next to the bayonet-body bumps so that the vehicle-body teeth between the vehicle-body bayonet notches bear on the recesses of the bayonet-plate teeth and together with the bayonet-plate bumps serve to limit rotation. The depth of the bayonet-plate recesses is such that they are less than the thickness of the plate forming the vehicle part so that there some gripping of the vehicle-body plate between the base plate and the bayonet plate from the spring. The spacing between the lower face of the base plate and the upper faces of the recesses of the bayonet plate can alternatively be such that it is less than the thickness of the plate forming the vehicle part.

In a further embodiment of the invention the spacers of the base plate are axially projecting bumps that are angularly adjacent the bayonet bumps. In this manner the spacers in the offset install position of the bayonet plate relative to the base plate produce the necessary spacing between these two parts while in the desired end holding position the bumps free the spacing between the two parts.

The screw connection between the base plate and the bayonet plate is a screw that is threaded into the base plate and that is surrounded by a compression spring. It can also be a simple bolt that passes through the base plate and has a nut on the opposite side of the spring. The simplest embodiment is a screwthread on the end of a base-plate pin on which the spring sits and that carries a nut and if necessary a washer (optional). Or the base plate is formed with a threaded collar for a screw that is passed from beneath with an optional washer into the collar and that fixes the spring and the bayonet plate on the collar.

Between the base plate and the screw head or a washer thereon there is preferably a spacer sleeve. This spacer sleeve defines on the one hand the prestressing of the spring so that it limits the extent to which the screw can be inserted. On the other hand the spacer sleeve is angularly fixed on the base plate or is even unitarily formed with it and has on its periphery ridges that coact with complementary segmental notches surrounding the central hole in the bayonet plate such that the end faces of the ridges form spacer elements for the bayonet plate in the offset or aligned position of the bayonet plate to the base plate and the ridges in the desired end nonaligned position engage in the notches and release the spring. This formation of the spacer sleeve as spacer element is alternative to or in addition to the base-body and bayonet bumps.

Mounting of the device on a vehicle body is done by the following steps:

First the bayonet plate is mounted on the base plate such that the spacer elements produce a space with the base plate, that is the base-body bumps engage the tooth bumps and/or the bayonet plate bears on the end faces of the ridges. The spring has been prestressed by tightening of the nut or the screw toward the spacer sleeve and bears against the nut or optional washer. The bayonet plate of the roof antenna is then fitted through the hole in the vehicle body with the bayonet teeth passing through the opening notches and the bayonet plate is rotated until the teeth formed between the opening notches of the vehicle body come between the recesses of the bayonet teeth and the base plate and the edges of these opening teeth abut the bayonet-teeth bumps. Then the base plate is turned relative to the bayonet plate that is arrested by the vehicle body until the spacer elements of the bayonet plate slip off the base plate. Then the full spring force is effective between the bayonet plate and the base plate and the base plate is pressed against the vehicle body and the vehicle-body plate is gripped so that the seal or seal strips on the base plate are pressed against the vehicle surface. On the upper face of the recesses turned toward the base plate there are preferably points that engage the vehicle body from inside, pierce the paint, and form a connection to ground.

Instead of the points a separate intermediate plate or layer can be provided on the bayonet plate that produces the ground contact. After engagement of the bayonet-teeth bumps in the space between the bayonet teeth and/or dropping of the ridges into the notches the roof antenna or its base plate is fixed relative to the bayonet plate. The bayonet plate in turn is fixed by the limiting elements or bumps in the roof opening and by the bumps in the recesses so that overall there is an exact and permanent mounting of the roof antenna on the vehicle body. The installation and fixing take place as seen by the installation steps without aids and tools and can be carried out from outside the vehicle by only one person or installer.

In order to uninstall the device without damaging it, a tool is proposed having a base body with two fork-like bars whose thickness generally corresponds to a height of the spacers. The base body has at least one and preferably two handles, to make it easy to manipulate.

To uninstall the tool with the bars is slid between the vehicle body and the base plate until the spacer elements and/or the bumps are lifted out of the seats. Then the base plate is shifted relative to the bayonet plate so far that the spacer elements and/or the bumps bear on the bayonet plate. This spaces the base plate from the bayonet plate. The roof antenna with the base plate and bayonet plate is then pivoted until the bayonet teeth of the bayonet plate are aligned with the bayonet notches of the hole in the vehicle body so that the roof antenna can be lifted and removed. The tool is preferably made of a soft plastic to protect the finish of the vehicle. Other formations of the antenna are possible if the described uninstalling procedures are used.

BRIEF DESCRIPTION OF THE DRAWING

An embodiment of the invention to which it is not limited in shown in FIGS. 1 to 5 and described below.

Therein.

SPECIFIC DESCRIPTION

Figure 1:
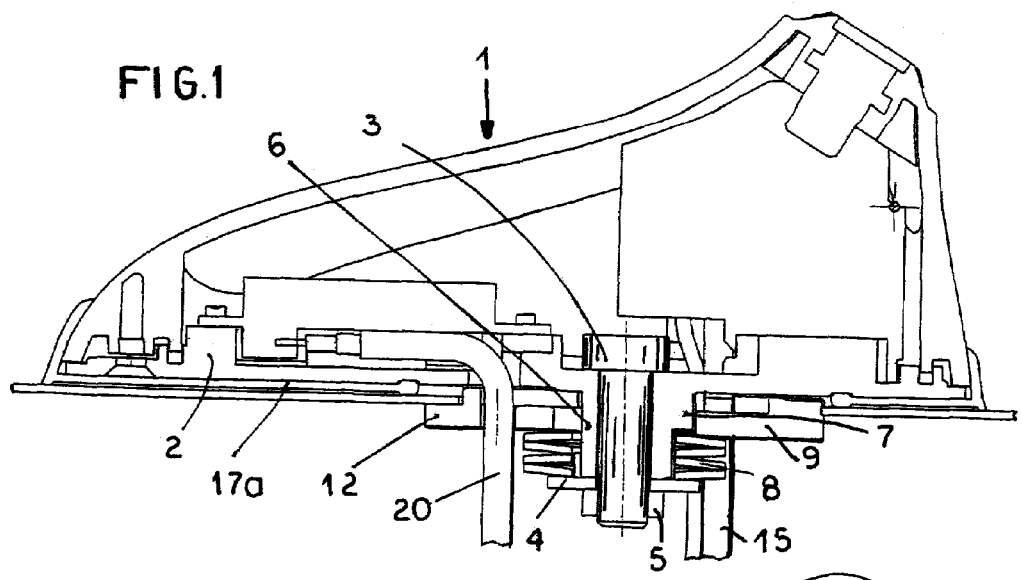
FIG. 1 is a section through a roof antenna and mount and a section through the vehicle body.

FIGS. 1 to 6 show in detail a roof antenna 1 comprised of a cover and electric components and a base plate 2. A screw 3 extending along an axis is set in the base plate 2 and carries outside the base plate a washer 4 and a nut 5.

Figure 4:
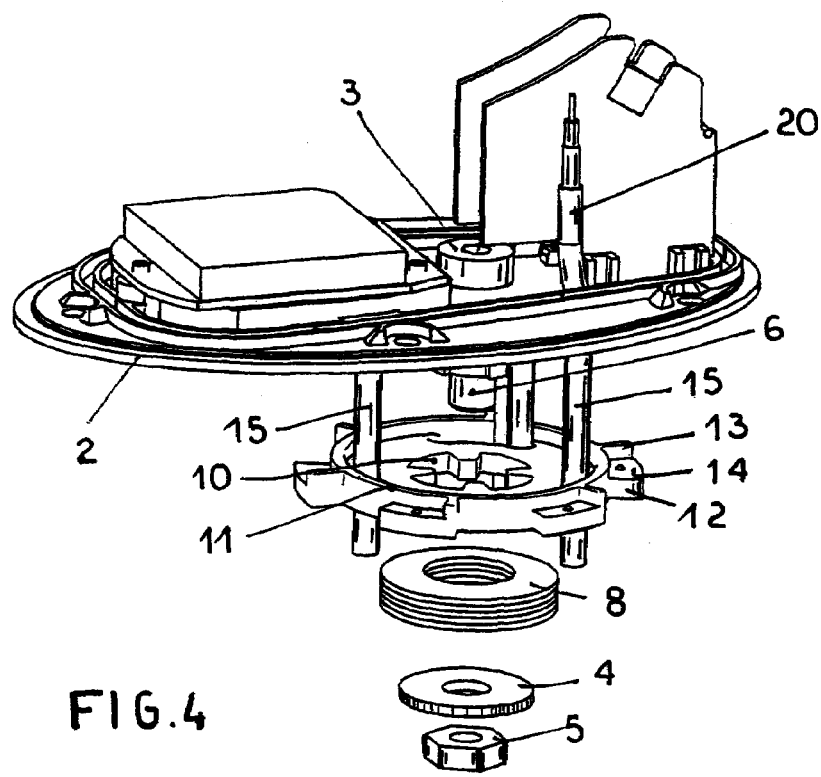
FIG. 4 is an exploded perspective view of a roof antenna and mount and vehicle body at an angle from above.

It is also noted that a screwthread can be provided in the base plate 2 and a screw can be threaded into it from outside the base plate 2 and roof antenna. In this case the base plate 2 forms the nut and a separate nut is not needed. The base plate 2 has a spacer sleeve 6 that is axially traversed by the screw 3. An outer surface of the spacer sleeve 6 is formed with radially outwardly projecting and axially extending ridges 7 that have a predetermined axial length from the base plate 2. Axially shorter radially projecting ridges 7a are provided offset angularly from the long ridges 7 on the sleeve 6. A compression spring 8 surrounds the spacer sleeve 6 outside the ridges 7 and 7a and is braced axially between the washer 4 and a bayonet plate 9, which as shown in FIG. 4 is separate from the base plate 2. The spring 8 can be a stack of spring washers or a spiral compression spring. It would also be possible for the spring element 8 to be connected to or part of the bayonet plate 9 or the washer 4. The bayonet plate 9 has a central bore formed with an array of radially inwardly open segment-shaped notch formations 10 that are spaced like the ridges 7 and that fit complementarily with them such that in an install position they hold the bayonet plate 9 at a spacing from the base plate 2 or, when the ridges 7 fit in the notches 10 in a holding position, allow this space to close to pinch the vehicle part 17a between the bayonet plate 9 and base plate 2. The dimensions of the ridges and of the notches are such that when fitted together in the nonaligned position they inhibit relative rotation of the base plate 2 and bayonet plate 9. The bayonet plate 9 has spaced radially outward from the notches 10 a center ring or ridge 11 projecting toward the base plate 2. The bayonet plate 9 has around the ring 11 bayonet teeth 12 each having at one edge a bump 13 that is of the same height as the center ring 11. Next to each bump 13 is a recess 14 that extends to the center ring 11 and to the opposite edge of the respective tooth 12. The base plate 2 carries bolts 15 that extend through slots 16 in the bayonet plate 9. The slots 16 extend angularly so that the bolts 15 can move limitedly angularly in the slots 16.

Figure 2:
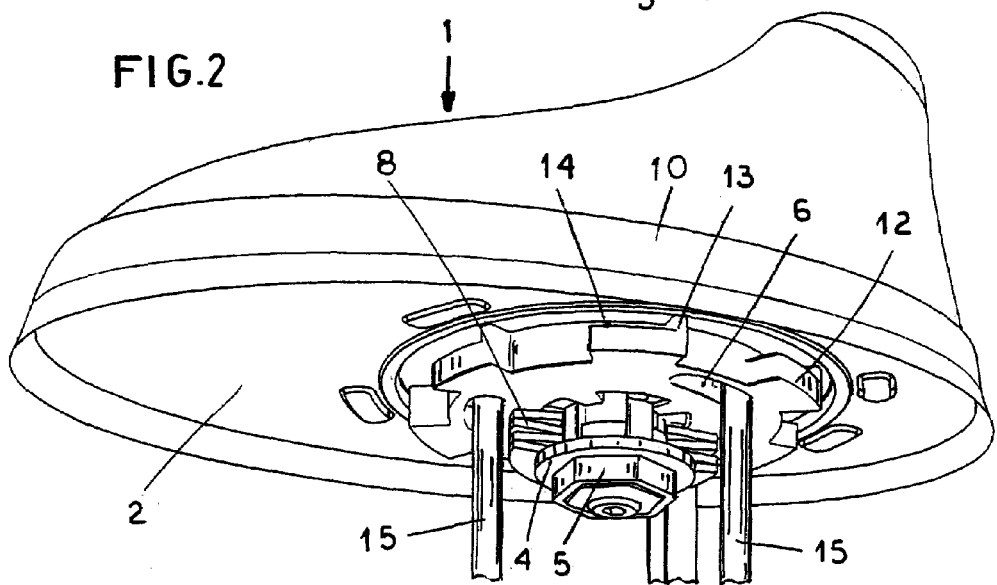
FIG. 2 is a perspective view from below of the roof antenna and mount.
Figure 3:
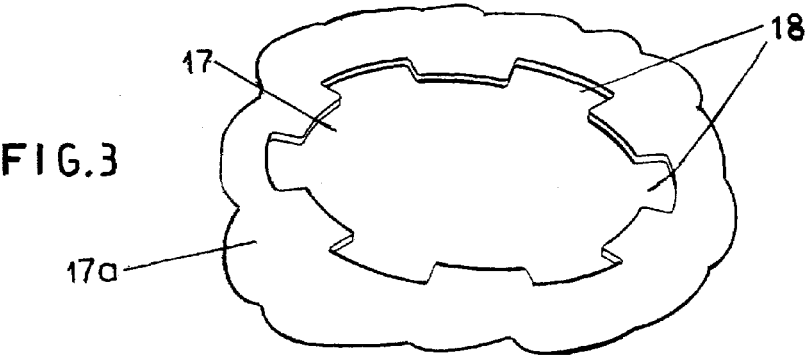
FIG. 3 is a detail view of a vehicle body with a hole in the body.

FIG. 2 shows the slots 16. Instead of a cable, a part can be soldered directly to the circuit board or formed on the base plate and extend through the bayonet plate, so that no cable is used and a vehicle-side coupling can be plugged directly into this socket. Of course additional limitation of rotation than the described bolts and slots are useful. As shown in particular in FIG. 3, the opening in the vehicle part 17a has a central hole 17 into which bayonet notches 18 open. The central hole 17 in the vehicle part 17a fits with the center ring 11 of the bayonet plate and the bayonet notches 18 fit with the bayonet teeth 12 of the bayonet plate 9.

Figure 5:
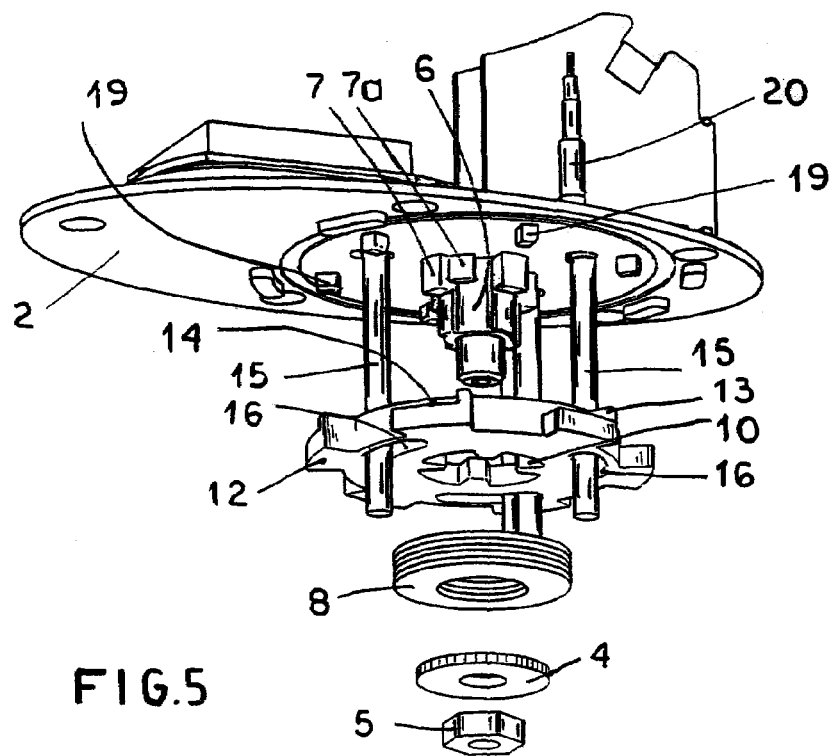
FIG. 5 is an exploded perspective view of a roof antenna and mount and vehicle body at an angle from below.

As particularly visible in FIG. 5, the base plate 2 is provided with bumps 19 that in an offset or angularly nonaligned position of the bayonet plate 9 relative to the base plate 2 fit against the bumps 13 and in the desired end position project between the bayonet teeth 12 of the bayonet plate 9.

An antenna cable 20 extends next to the bolts 15 through one of the slots 16 and thus is easily connected to the electronic components atop the base plate 2 in the roof antenna 1. This one slot is extra long to accommodate the cable 20. Separate slots can be provided for the cable(s) and bolt(s), in which case the slots can be just long enough for the actual relative angular movement of the bayonet plate relative to the base plate.

Figure 6:
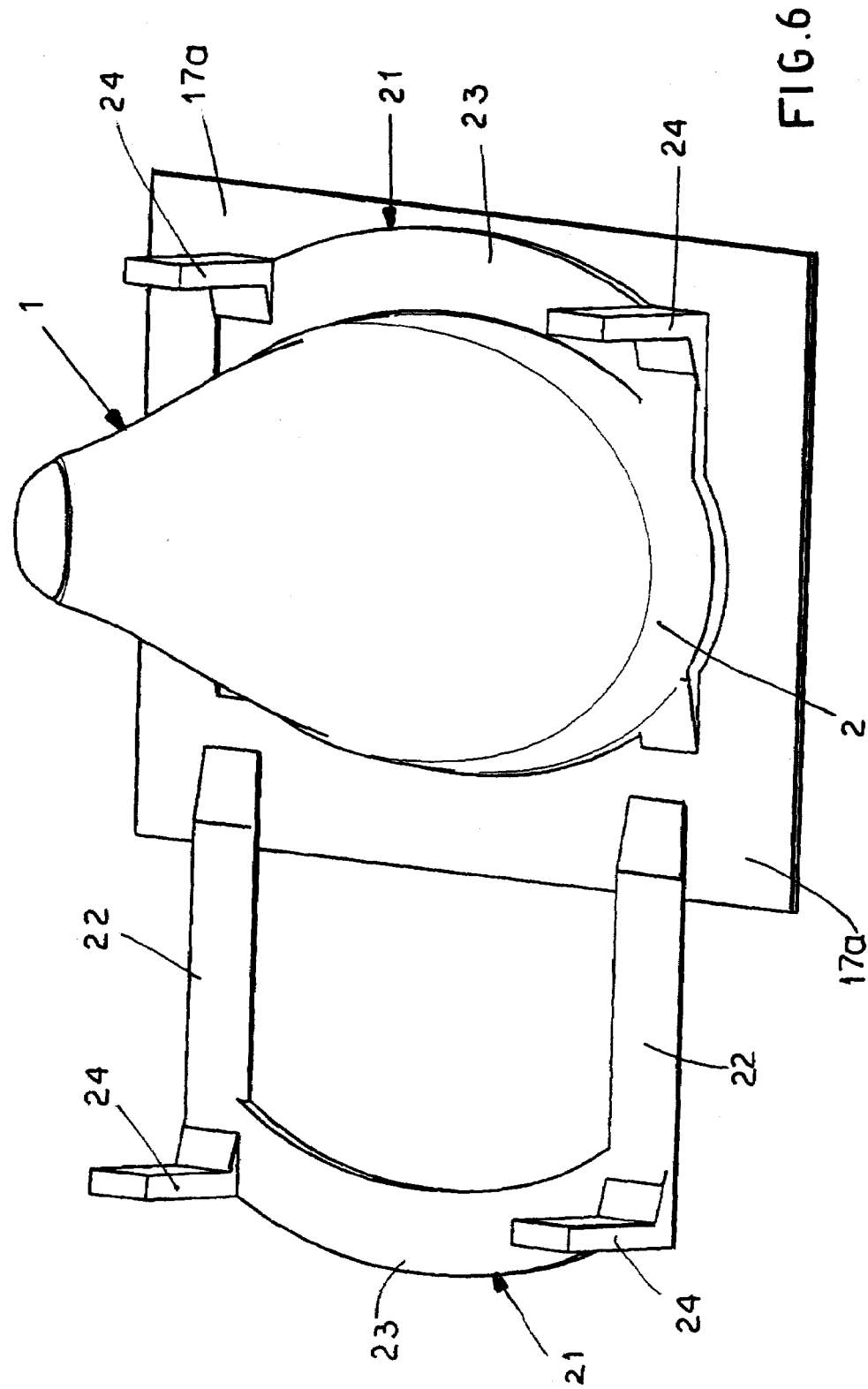
FIG. 6 is a top view of a roof antenna with its removal tool.

FIG. 6 shows a tool 21 having two bars 22 fixed together by a bight body 23. The body 23 has handles 24 that make it easy to use the tool 21. As shown on the right side of FIG. 6, the tool 21 can be slid between the base plate 2 and the car body 17a. It lifts the base plate 2 against the force of the compression spring 8 away from the vehicle body 17a so that the roof antenna 1 and the base plate 2 can be pivoted opposite to the install direction such that the bayonet plate 9 by means of the ridges 7 or the bumps 13 and 19 is spaced so far from the base plate 2 that it is easy to remove once the tool 21 has been pulled out.

It should be noted that uninstalling can also be done, when there is access from inside, by unscrewing the nut 5, removing the washer 4, and lifting off the bayonet plate 9.

The base plate 2 can also have the support surface for the base plate 2 on the vehicle body 17a, against which the body 17a engages when clamped and which produces a predetermined prestressing movement for a seal. In addition a soft outer seal lip can be provided on the base plate 2 so that the construction of the device advantageously ensures that until the spring force is effective it does not engage the vehicle-body surface and therefore does not rub on the vehicle body when being pivoted and is not damaged or folded over. The central ring 11 guides the roof antenna during pivoting in the central hole 17.

The antenna can be any type of antenna as shown and described which is mounted on or in a vehicle part. Preferably (but not restrictively) it is a roof antenna that is secured on a vehicle roof (also termed vehicle part or vehicle body but in any case without restriction since it can be another part of the vehicle as for example the trunk lid).

The invention claimed is:

1. An antenna for mounting on a motor-vehicle part formed with a throughgoing hole of nonround shape, the antenna comprising:
   a base plate engageable with the part over the hole;
   antenna components mounted on the base plate;
   a stem fixed in the base plate and projecting along an axis through the hole and having an outer end;
   a bayonet plate having an outer edge of nonround shape capable of passing axially through the hole of the part in an aligned position and not able to pass through the hole of the part in another angularly offset nonaligned position;
   support means supporting the bayonet plate on the base plate for angular movement of the bayonet plate relative to the base plate about the axis between an install position and a holding position;

a spring braced between the stem outer end and the bayonet plate and urging the bayonet plate axially toward the base plate and against the part; and spacer formations on the bayonet plate and base plate engageable with each other in the install position of the base plate and bayonet plate to hold the bayonet plate in an outer position at a predetermined large axial spacing from the base plate and disengaging from each other in the angularly offset holding position to allow the bayonet plate to be pressed by the spring into an inner position very closely juxtaposed with the base plate and tightly gripping the motor-vehicle part between the bayonet plate and the base plate.

2. The motor-vehicle antenna defined in claim 1, further comprising:

interengageable stop formations on the part and on the bayonet plate that engage axially together in the nonaligned position of the bayonet plate and inhibit rotation of the bayonet plate about the axis in the hole.

3. The motor-vehicle antenna defined in claim 2, wherein the support means includes guides engaged between the bayonet plate and the base plate allowing the bayonet plate to move angularly limitedly about the axis relative to the base plate, whereby, after insertion of the bayonet plate through the hole in the aligned position and rotation of the bayonet plate and base plate to the nonaligned position with the stop formations engaged, further rotation of the base plate relative to the bayonet plate disengages the spacer formations from each other.

4. The motor-vehicle antenna defined in claim 3 wherein the bayonet plate is formed with radially outwardly projecting teeth and the hole is formed with radially inwardly open generally complementary notches, the stop formations being a bump projecting axially from at least one of the teeth toward the base plate at an edge thereof.

5. The motor-vehicle antenna defined in claim 3 wherein the guides are axially extending bolts projecting from the base plate and respective arcuate angularly extending slots in the bayonet plate through which the bolts extend.

6. The motor-vehicle antenna defined in claim 1 wherein the stem is formed by a bolt projecting from the base plate and a nut on an outer end of the bolt, the spring surrounding the bolt and being braces against the nut.

7. The motor-vehicle antenna defined in claim 6 wherein the stem further has a sleeve surrounding the bolt and surrounded by the spring.

8. The motor-vehicle antenna defined in claim 6 wherein the stem further has a washer fitted between the nut and an outer end of the spring.

9. The motor-vehicle antenna defined in claim 1, further comprising a tool for installing the antenna, the tool having:

a bight part; and a pair of generally parallel arms spaced apart by a distance smaller than a diameter of the bayonet plate and of a thickness equal generally to an axial height of the spacer.

10. An antenna for mounting on a motor-vehicle part formed with a throughgoing hole of nonround shape, the antenna comprising:

a base plate engageable with the part over the hole;

antenna components mounted on the base plate;

a stem fixed in the base plate and projecting along an axis through the hole and having an outer end;

a bayonet plate having an outer edge of nonround shape capable of passing axially through the hole of the part in an aligned position and not able to pass through the hole of the part an another angularly offset nonaligned position;

support means supporting the bayonet plate on the base plate for angular movement of the bayonet plate relative to the base plate about the axis between an install position and a holding position;

a spring braced between the stem outer end and the bayonet plate and urging the bayonet plate axially toward the base plate and against the part;

spacer formations on the bayonet plate and base plate engageable with each other in the install position of the base plate and bayonet plate to hold the bayonet plate in an outer position at a predetermined large axial spacing from the base plate and disengaging from each other in the angularly offset holding position to allow the bayonet plate to be pressed by the spring into an inner position very closely juxtaposed with the base plate and tightly gripping the motor-vehicle part between the bayonet plate and the base plate; and interengageable stop formations on the part and on the bayonet plate that engage axially together in the nonaligned position of the bayonet plate and inhibit rotation of the bayonet plate about the axis in the hole.

\* \* \* \* \*